(12) United States Patent
Fujii et al.

(10) Patent No.: US 8,892,313 B2
(45) Date of Patent: Nov. 18, 2014

(54) SEAT BELT WARNING DEVICE

(71) Applicant: Aisin Seiki Kabushiki Kaisha, Kariya (JP)

(72) Inventors: Hiroyuki Fujii, Kariya (JP); Takahiro Izuno, Kariya (JP); Isao Honda, Anjo (JP); Yoshiaki Tomatsu, Kariya (JP); Yusuke Takahashi, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 13/798,554

(22) Filed: Mar. 13, 2013

(65) Prior Publication Data

US 2014/0277948 A1 Sep. 18, 2014

(51) Int. Cl.
*B60R 22/00* (2006.01)
*B60R 22/48* (2006.01)

(52) U.S. Cl.
CPC ...................................... *B60R 22/48* (2013.01)
USPC ................................. 701/45; 701/49; 701/36

(58) Field of Classification Search
None
See application file for complete search history.

(56) References Cited

U.S. PATENT DOCUMENTS

| 8,285,455 B2 | 10/2012 | Inayoshi et al. | |
| 2011/0012402 A1* | 1/2011 | Inayoshi et al. | ........... 297/217.2 |
| 2011/0095580 A1* | 4/2011 | Inayoshi et al. | ........... 297/217.1 |

FOREIGN PATENT DOCUMENTS

JP 9-207638 8/1997

* cited by examiner

*Primary Examiner* — John R Olszewski
*Assistant Examiner* — Gerrad A Foster
(74) *Attorney, Agent, or Firm* — Oblon, Spivak, McClelland, Maier & Neustadt, L.L.P.

(57) ABSTRACT

In a seatbelt warning apparatus, a control unit performs a transition process configured to transfer the mode to a baggage recognition mode on the condition that a load detection unit detects a load larger than a first load and smaller than a second load continuously for a preset time in the not-seated recognition mode, and to the not-seated recognition mode on the condition that the load detection unit detects a load smaller than a predetermined load continuously for a preset time in the baggage recognition mode, and a transfer time t1 required to transferring to the baggage recognition mode in the transition process is set to be shorter than a time T required for increasing the load from the first load to the second load by the vehicle acceleration characteristics.

6 Claims, 5 Drawing Sheets

SEAT BELT WARNING DEVICE

TECHNICAL FIELD

This disclosure relates to a seatbelt warning apparatus.

BACKGROUND ART

An automotive vehicle is configured to encourage a passenger to fasten a seatbelt by an alarm such as a buzzer when the passenger is seated on a vehicle seat but does not fasten the seatbelt nevertheless. When the passenger is seated on a passenger seat, an airbag is deployed in case of accident.

Therefore, the vehicle seat is provided with a load detection unit configured to detect a load of the passenger, and determines to be "seated" that means the passenger is seated when the load detected by the load detection unit exceeds a predetermined threshold set in advance, and determines to be "not seated" when the load is not higher than the predetermined value.

An example of a passenger sensing unit configured to determine the presence or absence of the passenger by sensing a load acting on the seat is described in JP 09-207638 A (hereinafter, referred to as Reference 1). In the passenger sensing unit disclosed in Reference 1, load sensors are installed only at two front and rear positions from among four seat mounting portions, whereby the presence or absence of the passenger is determined from the sum of the obtained two load values.

According to the passenger sensing unit described above, by mounting the load sensors at two positions at the front and the rear on the left or right side of the sensor mounting portion, the presence or absence of the passenger may be determined while minimizing the number of positions of installation of the load sensors, and achieving cost reduction and weight reduction of the unit.

However, in a configuration in which the load sensors are installed at two positions at the front and the rear on the left or right side of the seat mounting portion, the load to be detected by the load detection unit at the time of sudden turning of the vehicle is increased, and it may be erroneously recognized as being "seated" which indicates that the passenger is seated even when a light baggage is placed on the vehicle seat.

Accordingly, it is determined to be "passenger present" even though the passenger is not seated, an alarm of "seatbelt not fastened" is issued. Subsequently, when the load to be detected by the load detection unit is decreased with decrease in acceleration acting on the vehicle, the alarm of "seatbelt not fastened" is stopped. In this manner, an erroneous alarm which encourages fastening of the seatbelt may be repeated depending on the traveling state of the vehicle, which may give a driver a feeling of discomfort.

Therefore, a seatbelt warning apparatus configured so as not to be associated with drawbacks as described above is desired.

SUMMARY

A seatbelt warning apparatus disclosed here includes: a seatbelt configured to constrain a passenger seated on a vehicle seat when fastened and release the passenger when not fastened; a load detection unit including a pair of left and right two load sensors provided on the rear of the vehicle seat and configured to detect a load acting on a seat surface of the vehicle seat; a warning member configured to encourage fastening of the seatbelt according to the load detected by the load detection unit; and a control unit configured to bring the mode to one of a not-seated recognition mode which corresponds to a not-seated state, a passenger-seated recognition mode in which it is determined that the passenger is seated and the warning member is brought into an operation-permitted state, and a baggage recognition mode in which it is determined that a baggage is placed and the warning member is brought into an operation-not-permitted state, and the control unit performs a transition process configured to transfer the mode to the baggage recognition mode on the condition that the load detection unit detects a load larger than a first load and smaller than a second load continuously for a preset time in the not-seated recognition mode, and to the not-seated recognition mode on the condition that the load detection unit detects a load smaller than a predetermined load continuously for a preset time in the baggage recognition mode, and a transfer time t1 required for transferring to the baggage recognition mode in the transition process is set to be shorter than a time T required for increasing the load from the first load to the second load by the vehicle acceleration characteristics.

DETAILED DESCRIPTION

Figure 1:
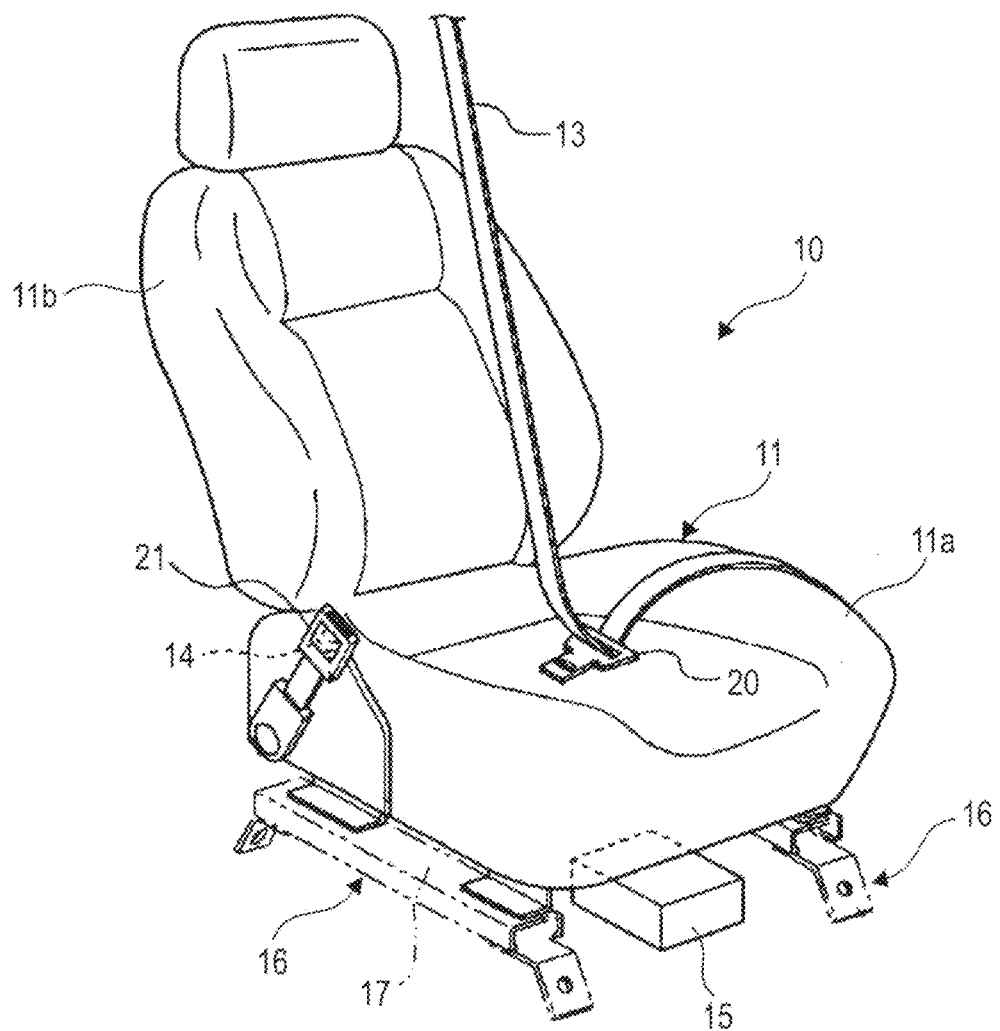
FIG. 1 is a perspective view of a vehicle seat provided with a seatbelt warning apparatus disclosed here.

Referring now to the drawings, an embodiment disclosed here will be described below. The directions such as "fore-and-aft, left and right, up and down" used in this specification are described with reference to the respective directions of the vehicle viewed from a passenger seated on a vehicle seat 11. In this embodiment, it is assumed that the vehicle has a steering wheel on the left side, and that the presence or absence of the passenger seated on a passenger seat is determined.

As illustrated in FIG. 1, the vehicle seat 11 on the passenger seat side includes a seat cushion 11a as a seat surface where the passenger is to be seated, and a seatback 11b as a backrest mounted so as to be rotatable in the fore-and-aft direction at a rear end portion of the seat cushion 11a. The vehicle seat 11 includes a load detection unit 12 (see FIG. 2 and FIG. 3) configured to detect a load of the passenger seated on the seat cushion 11a or a baggage, a seatbelt 13 configured to constrain the passenger seated on the vehicle sheet 11 and release the passenger when not fastened, and a buckle switch 14 configured to detect whether the seatbelt 13 is in the fastened state or not in the fastened state, and a controller 15.

Figure 2:
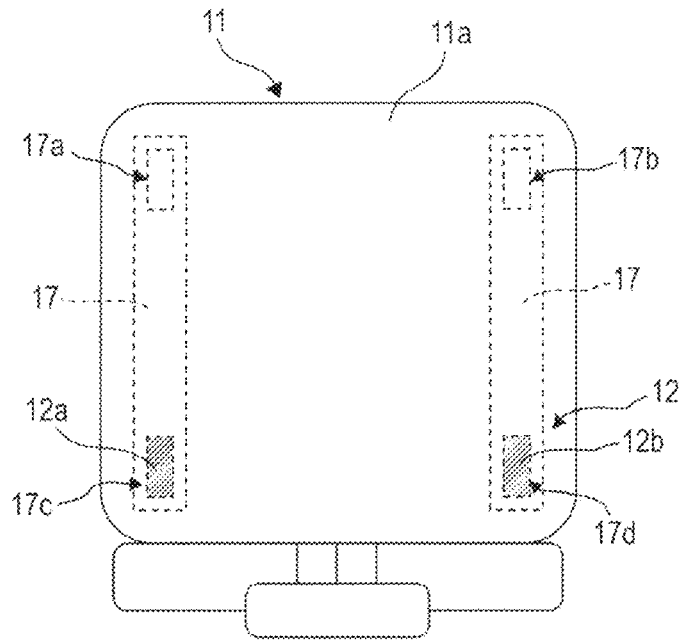
FIG. 2 is a top view of the vehicle seat.

The vehicle seat 11 is supported by a vehicle floor via a pair of left and right upper rails 17 of a seat sliding unit 16 which supports the vehicle seat 11 so as to be capable of adjusting the position thereof in the fore-and-aft direction of the vehicle. As illustrated in FIG. 2, four supporting leg portions 17a, 17b, 17c, and 17d supporting the seat cushion 11a of the vehicle seat 11 are disposed at four corners apart from each other in the left and right direction and the fore-and-aft direction of the vehicle on the pair of left and right upper rails 17.

The load detection unit 12 includes two load sensors 12a and 12b, and the load sensors 12a and 12b are each formed of a strain gauge-type sensor having an amplifier integrated therein. The two load sensors 12a and 12b are interposed between the seat cushion 11a and the upper rails 17 at two positions at rear left and right of the four supporting leg portions 17a to 17d described above, so that the load of the passenger or the like seated on the seat cushion 11a of the vehicle seat 11 can be detected by the two load sensors 12a and 12b.

The seatbelt 13 is provided with a tongue plate 20 in the middle thereof as illustrated in FIG. 1, and a buckle 21 engageable with the tongue plate 20 is provided at a side portion of the seat cushion 11a. The buckle 21 includes the buckle switch 14 integrated therein, so that an ON signal indicating that the seatbelt 13 is in a fastened state is output from the buckle switch 14 when the tongue plate 20 is engaged with the buckle 21. When the tongue plate 20 is not engaged with the buckle 21, the buckle switch 14 outputs an OFF signal indicating that the seatbelt 13 is not in the fastened state.

Figure 3:
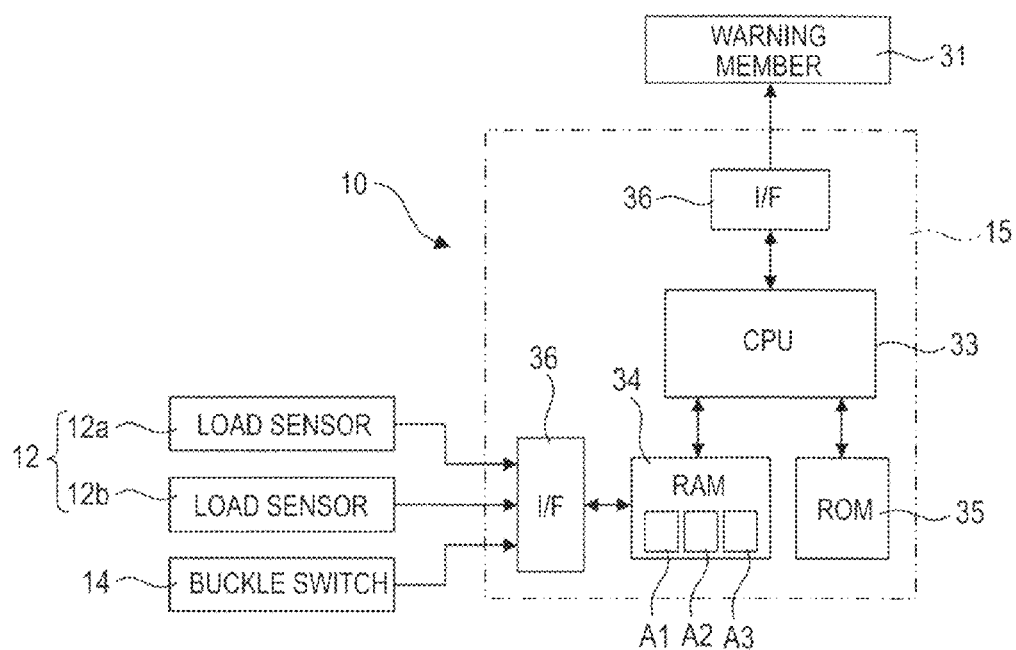
FIG. 3 is a block diagram of the seatbelt warning apparatus.

FIG. 3 is a block diagram of the seatbelt warning apparatus 10, and the controller (ECU) 15 as a control unit includes a CPU 33, a RAM 34, a ROM 35, and an interface 36. The ROM 35 includes a belt warning determination program stored therein. The RAM 34 is configured to allow entry of the load signals detected by the two load sensors 12a and 12b and the ON/OFF signal from the buckle switch 14 of the seatbelt 13 via the interface 36. A warning member 31 configured to give warning about unfastening of the seatbelt 13 is connected to the CPU 33 via the interface 36. The warning member 31 is composed of a buzzer or an indicator lamp or the like, and is configured to encourage the passenger to fasten the seatbelt 13 by issuing the alarm when the seatbelt 13 is not in the fastened state (the buckle switch 14 is OFF) even though the passenger is seated on the seat cushion 11a.

The CPU 33 detects the weight of the passenger seated on the vehicle seat 11 and the weight of the baggage placed on the vehicle seat 11 by performing an adding process on the load signals from the two load sensors 12a and 12b transmitted to the RAM 34. For example, when the passenger or the like is seated on the vehicle seat 11 in a normal posture, substantially equivalent loads are applied to the two load sensors 12a and 12b disposed at two positions on the left and right side of the rear portion of the seat cushion 11a. In contrast, when the passenger or the like is seated in a posture leaned toward the right or left, a larger load is applied on one of the two load sensors 12a and 12b, and a smaller load is applied on the other one of those.

Accordingly, the weight of the passenger seated on the vehicle seat 11 and the weight of the baggage may be detected by adding the respective load signals detected by the two load sensors 12a and 12b by the CPU 33. The outputs from the load sensors 12a and 12b are calibrated to zero point in a state in which the vehicle is situated on a flat ground and in a vacant state in which nobody is seated or nothing is placed on the seat cushion 11a.

The RAM 34 is provided with a memory area A1 in which a "not-seated recognition mode" M1 which recognizes a no-seated state in which the passenger is not seated on the vehicle seat 11 is stored, a memory area A2 in which a "passenger-seated recognition mode" M2 which recognizes a state in which the passenger is seated and brings the warning member 31 into an operation-permitted state is stored, and a memory area A3 in which a "baggage recognition mode" M3 which recognizes a state in which the baggage is placed and brings the warning member 31 into an operation-not-permitted state is stored.

Figure 4:
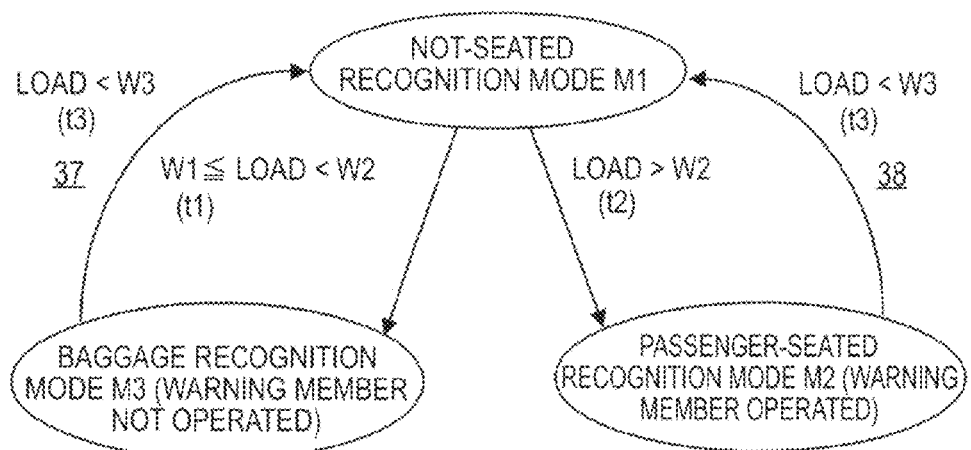
FIG. 4 is a drawing illustrating a state of transition of the seatbelt warning apparatus.

The controller 15 is configured to perform a first transition process 37 and a second transition process 38 as illustrated in FIG. 4. The first transition process 37 is configured to transfer the mode to the "baggage recognition mode" M3 on the condition that the load detection unit 12 detects a load larger than a first load W1 and smaller than a second load W2 continuously for a preset time t1 in the "not-seated recognition mode" M1, and to the "not-seated recognition mode" M1 on the condition that the load detection unit 12 detects a load smaller than a third load W3 slightly smaller than the first load W1 continuously for a preset time t3 in the "baggage recognition mode" M3.

The second transition process 38 is configured to transfer the mode to the "passenger-seated recognition mode" M2 on the condition that the load detection unit 12 detects a load larger than the second load W2 continuously for a preset time t2 in the "not-seated recognition mode" M1, and to the "not-seated recognition mode" M1 on the condition that the load detection unit 12 detects a load smaller than the third load W3 continuously for the preset time t3 in the "passenger-seated recognition mode" M2.

The time t1 for transferring the mode to the "baggage recognition mode" M3 is set as described later. The time t3 for transferring the mode to the "not-seated recognition mode" M1 is preferably set to be slightly longer than the time t1 and the time t2.

Accordingly, the transition of the state of determination between the "passenger-seated recognition mode" M2 and the "baggage recognition mode" M3 is eliminated, and an erroneous issue of an alarm signal indicating "belt-unfastened" is avoided even when the load value to be detected by the load detection unit 12 is increased in the "baggage recognition mode" M3.

In this embodiment, the grounds that the reference of determination of the "passenger-seated recognition mode" M2 is determined to be a case where a load not lower than the second load W2 is detected by the load detection unit 12 are that the load detection unit 12 is configured to be capable of sensing the fact that the passenger is seated even when children from 6 years or old or relatively undersized adult women who is required to fasten the seatbelt 13 are seated on the front portion of the seat cushion 11a.

In the configuration in which the two load sensors 12a and 12b are arranged on left and right sides of the rear portion of the vehicle seat 11, for example, when the baggage is placed on the seat cushion 11a, the load values detected by the two load sensors 12a and 12b do not exceed the second load W2 at which it is determined that the passenger is seated at the time of normal travelling.

However, when significant acceleration acts on the vehicle seat 11 in the fore-and-aft direction thereof due to the sudden start or sudden acceleration of the vehicle, the weight of the baggage on the seat cushion 11a acts more on the rear portion of the seat cushion 11a and, consequently, an apparent load value detected by the load detection unit 12 may become larger than the second load W2 at which it is determined that the passenger is seated. Therefore, in the related art, it is determined that the seatbelt is unfastened even though no passenger is seated on the vehicle seat 11 and hence an erroneous alarm signal may be issued by the warning member 31.

Figure 5:
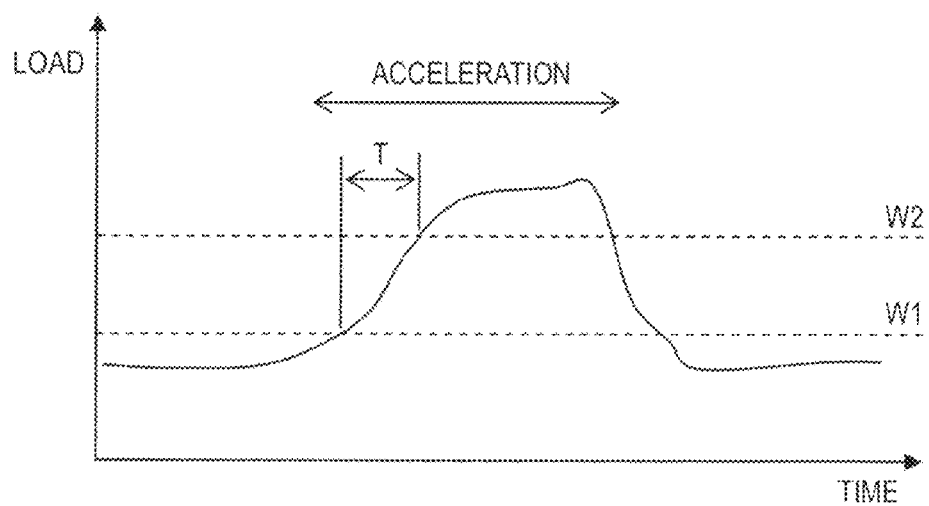
FIG. 5 is a graph illustrating a change of an output of a load detection unit at the time of sudden start of a vehicle.

FIG. 5 is experimental data showing an output of the load detection unit 12 when the vehicle is suddenly started with the vehicle seat 11 in a vacant state, and the lateral axis indicates time and the vertical axis indicates a load detected by the load detection unit 12.

It is understood from FIG. 5 that when significant acceleration acts on the vehicle seat 11 in the fore-and-aft direction by the sudden start of the vehicle, the load value detected by the load detection unit 12 is increased as indicated by a solid line even though the vehicle seat 11 is vacant. In other words, the output of the load detection unit 12 is abruptly increased beyond the first load W1 to the second load W2 by the sudden start of the vehicle. In this case, the time required for increase in load from the first load W1 to the second load W2 becomes substantially "T" although it is different depending on the magnitude of the acceleration and the mass of the vehicle seat 11.

Therefore, even when the baggage lighter than the first load W1 or the second load W2 is placed on the vehicle seat 11, the output of the load detection unit 12 exceeds the second load W2 within time at least shorter than time T described above due to the sudden start of the vehicle. Therefore, when the vehicle starts suddenly in a state in which the light baggage is placed on the vehicle seat 11, an erroneous recognition that the passenger is seated may occur.

Accordingly, in this embodiment, the transfer time t1 from the "not-seated recognition mode" M1 to the "baggage recognition mode" M3 described above is set to be shorter than the time T described above, for example, to approximately half the time T (t1=T/2). The time T is a value obtained from experimentally and empirically while considering the time of limitation characteristic of the vehicle.

In other words, when the baggage is placed on the vehicle seat 11, the output of the load detection unit 12 is abruptly increased due to the sudden start of the vehicle. However, by fixing the transfer of the mode to the "baggage recognition mode" M3 in the time t1 shorter than the time T described above, the transfer of the mode to the "baggage recognition mode" M3 is already complete at the time when the output of the load detection unit 12 exceeds the second load W2, and the mode is not transferred to the "passenger-seated recognition mode" M2.

Figure 6:
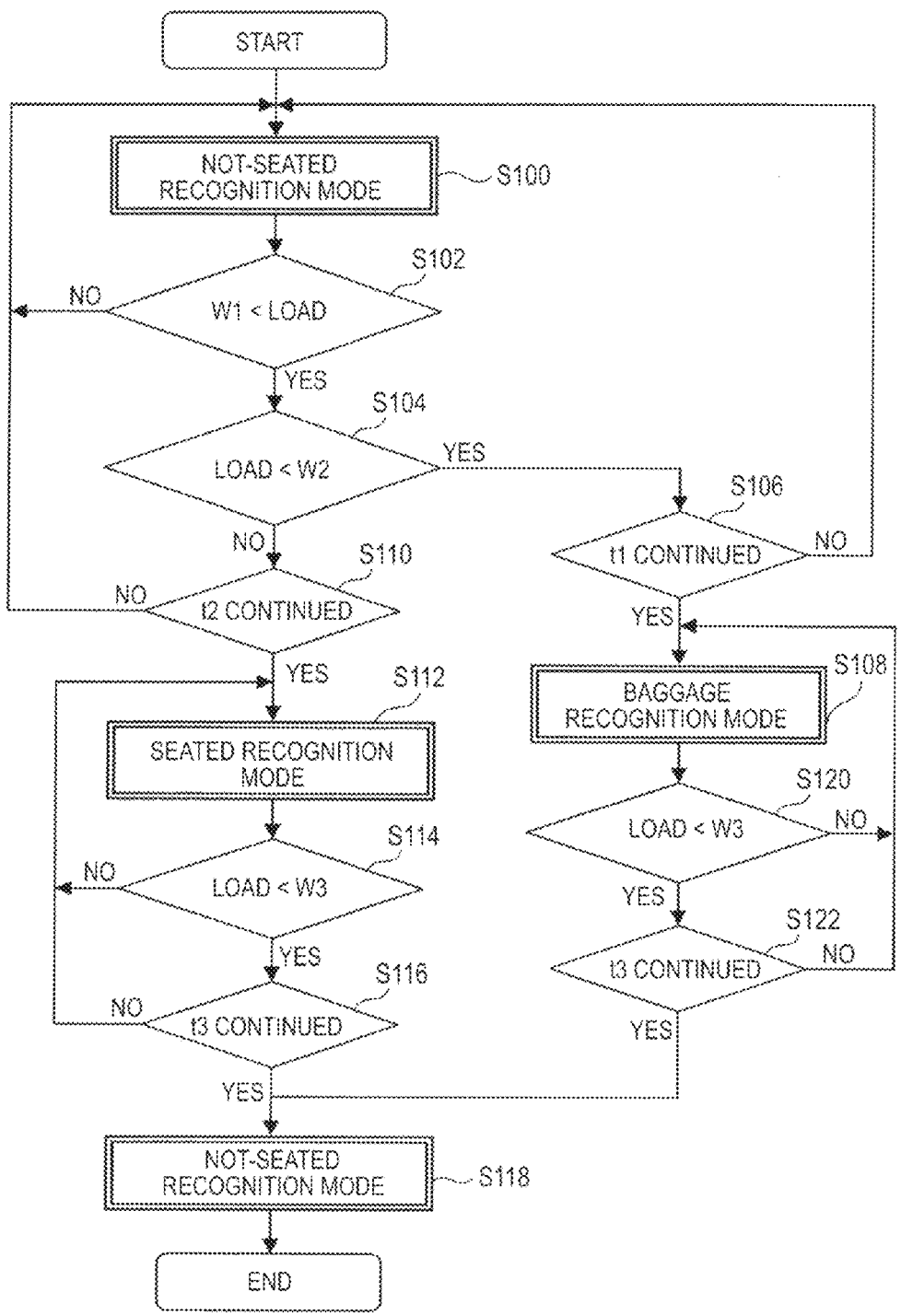
FIG. 6 is a drawing showing a flowchart of the seatbelt warning apparatus.

Subsequently, a belt warning determination program in the embodiment described above will be descried on the basis of the flowchart in FIG. 6. When the ignition switch is turned ON, the belt warning determination program is started. The belt warning determination program described above is performed repeatedly in a predetermined sampling cycle. First of all, in the "not-seated recognition mode" M1 in Step S100, and then in Step S102, whether or not the load detected by the load detection unit 12 is larger than the first load W1 is determined (Step S102). When the detected load is larger than the first load W1 and the result of determination of Step S102 is Yes, whether or not the load detected by the load detection unit 12 is smaller than the second load W2 is determined in subsequent Step S104. When the result of determination in Step S104 is Yes, that is, when the load detected by the load detection unit 12 is determined to be within a range from the first load W1 to the second load W2, whether or not the result of determination is continued during the predetermined time t1 set in advance is determined in subsequent Step S106. When the result of determination in Step S106 is YES, it is determined to be in the "baggage recognition mode" M3 in Step S108 and the result is stored in the RAM 34 of the controller 15. When the mode is determined to be the "baggage recognition mode" M3, the warning member 31 is turned OFF to prevent the warning member 31 from being activated.

In contrast, when the result of determination in Step S104 is NO, that is, when the load detected by the load detection unit 12 is determined to exceed the second load W2, whether or not the result of determination is continued during the predetermined time t2 is determined in subsequent Step S110. When the result of determination in Step S110 is YES, it is determined to be in the "passenger-seated recognition mode" M2 in Step S112 and the result is stored in the RAM 34 of the controller 15. When the mode is determined to be the "passenger-seated recognition mode" M2, the warning member 31 is turned ON. Simultaneously, an airbag display lamp, not illustrated, is turned ON and the fact that the airbag is in the operable state is notified.

When the result of determination in Step S106 or Step S110 is NO, in other words, when the load within a predetermined range or a load exceeding a predetermine range is not continued for the predetermined time t1 or t2, the procedure goes back to Step S100.

When the mode is determined to be the "passenger-seated recognition mode" M2 in the Step S112 described above, it is determined whether or not the load detected by the load detection unit 12 is not higher than the third load W3 and this state is continued for the predetermined time t3 set in advance is determined in Step S114 and the Step S116. For example, when the passenger seated on the vehicle seat 11 gets off the vehicle and the vehicle seat 11 becomes a vacant state, and hence the load acts thereon is reduced to a load not higher than the third load W3 and, this state is continued for the time t3, the mode is transferred to the "not-seated recognition mode" M1 in Step S118. When the load detected by the load detection unit 12 exceeds the third load W3 or when the state not higher than the third load W3 is not continued for the time t3 in Step S114 and Step S116, the "passenger-seated recognition mode" M2 is maintained.

In the same manner, in the "baggage recognition mode" M3 described above, whether or not the load detected by the load detection unit 12 is not higher than the third load W3 and this state is continued for the predetermined time t3 set in advance is determined in Step S120 and the Step S122. For example, when the vehicle is stopped, the baggage placed on the vehicle seat 11 is removed, and the load acting on the vehicle seat 11 is reduced to a load not higher than the third load W3, and this state is continued of the time t3, the mode is transferred to the "not-seated recognition mode" M1 in Step S118.

In this manner, by setting the time t1 required for transferring the mode to the "baggage recognition mode" M3 to be shorter than the time T required for increasing the load from the first load W1 to the second load W2 by the vehicle acceleration characteristics, even when the load detected by the load detection unit 12 becomes larger than the second load W2 at which it is determined that the passenger is seated, transfer of the mode to the "baggage recognition mode" M3 may be completed before the load exceeds the second load W2 by the influence of the acceleration acting on the vehicle. Accordingly, erroneous issue of the alarm signal indicating that the seatbelt is unfastened due to erroneous recognition as if the passenger is seated is reliably avoided.

According to the embodiment described above, the controller 15 performs the first transition process 37 configured to transfer the mode to the "baggage recognition mode" M3 on the condition that the load detection unit 12 detects a load larger than the first load W1 and smaller than the second load W2 continuously for the preset time t1 in the "not-seated recognition mode" M1, and to the "not-seated recognition mode" M1 on the condition that the load detection unit 12 detects a load smaller than the third load W3 continuously for the preset time t3 in the "baggage recognition mode" M3. The controller 15 performs the second transition process 38 configured to transfer the mode to the "passenger-seated recognition mode" M2 on the condition that the load detection unit 12 detects a load larger than the second load W2 continuously for the preset time t2 in the "not-seated recognition mode" M1, and to the "not-seated recognition mode" M1 on the condition that the load detection unit 12 detects a load smaller than the third load W3 continuously for the preset time t3 in the "passenger-seated recognition mode" M2. Then, the transfer time t1 to the "baggage recognition mode" M3 in the first transition process 37 is set to be shorter than the time T required for increasing the load from the first load W1 to the second load W2 by the vehicle acceleration characteristics.

Accordingly, in the state in which the baggage is placed on the seat cushion 11a of the vehicle seat 11, even when the load detected by the load detection unit 12 becomes larger than the second load W2 at which it is determined that the passenger is seated by the influence of the acceleration acting on the vehicle, transfer of the mode to the "baggage recognition mode" M3 may be fixed before the load exceeds the second load W2. Consequently, erroneous issue of the alarm signal indicating "seatbelt unfastened" is avoided.

In addition, after the "baggage recognition mode" M3 or the "passenger-seated recognition mode" M2 is fixed once, determination is not switched between the "baggage recognition mode" M3 and the "passenger-seated recognition mode" M2, alarm indicating that the seatbelt is unfastened is not repeated by variations in load.

According to the embodiment described above, the load detection unit 12 includes the two load sensors 12a and 12b arranged on the left and right side of the rear portion of the vehicle seat 11 on the lower side thereof, and the time t1 corresponds to time required for the load detected by the load detection unit 12 by the fore-and-aft acceleration caused by the acceleration of the vehicle to increase from the first load W1 to the second load W2. Therefore, even when the two load sensors 12a and 12b are arranged on the left and right of the rear portion of the vehicle seat 11, erroneous determination due to the sudden start or the like of the vehicle may be restrained, and cost reduction of the load detection unit 12 may be realized.

Figure 7:
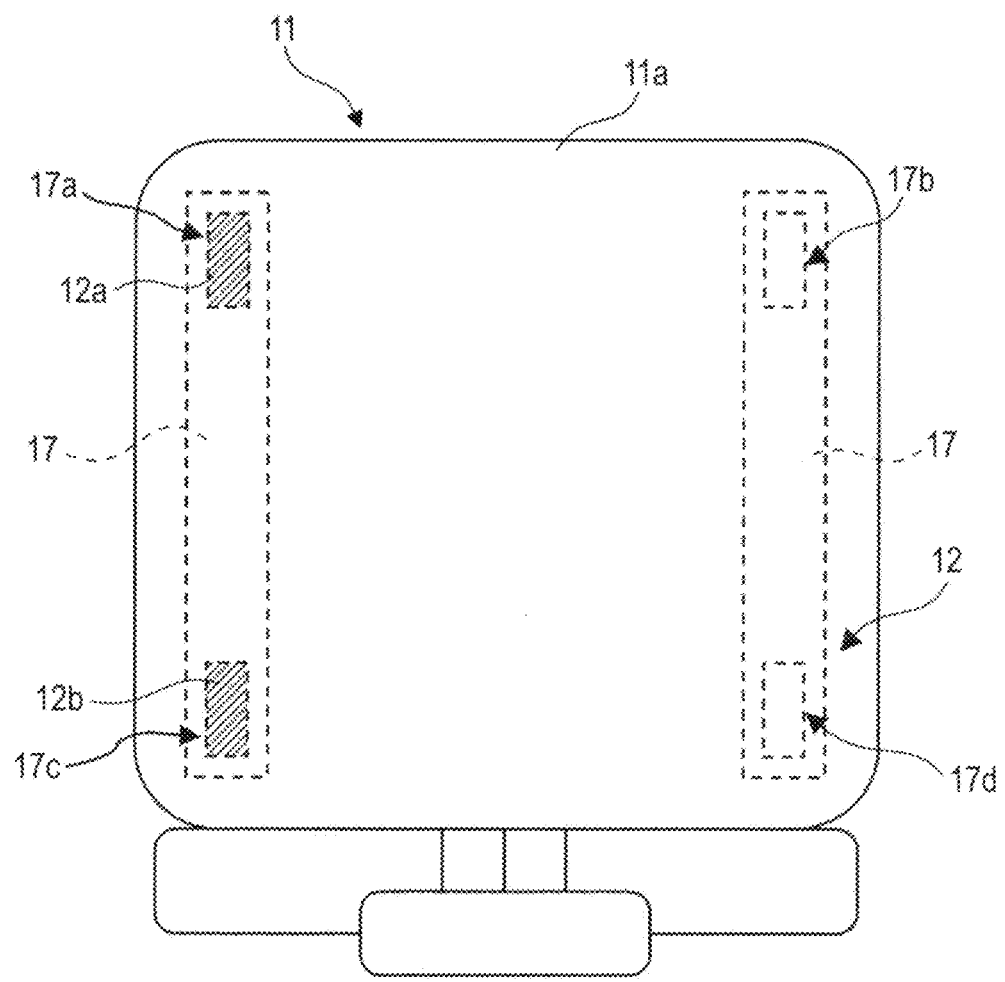
FIG. 7 is top view of the vehicle seat according to another modification.

In addition, in the embodiment described above, an example in which the two load sensors 12a and 12b on the left and right side of the rear portion of the vehicle seat 11 on the lower side thereof are arranged so that the erroneous determination as of the passenger is seated due to the fore-and-aft acceleration caused by the sudden start or the like of the vehicle is avoided has been described. However, the two load sensors 12a and 12b may be arranged at the front and the rear on one of the left and right of the vehicle seat 11 as illustrated in FIG. 7. In such a case, even when the load value detected by the load sensors 12a and 12b are increased by the lateral acceleration caused by sudden turning or the like of the vehicle, erroneous determination as if the passenger is seated may be prevented.

In the embodiment described above, an example in which a hysteresis is provided so that the mode is determined to be "baggage recognition mode" M3 when the load detection unit 12 detects a load larger than the first load W1 and smaller than the second load W2 for a predetermined time, the mode is determined to be the "passenger-seated recognition mode" M1 when the load detection unit 12 detects a load larger than the second load W2 for a predetermined time, and the mode is transferred to the "not-seated recognition mode" M1 when the load detection unit 12 detects the third load W3 smaller than the first load W1 for a predetermined time has been described. However, the lower limit load at which the mode is determined to be the "baggage recognition mode" M3 (the first load W1) and the load (the third load W3) at which the mode is transferred to the "not-seated recognition mode" M1 do not necessarily have to be different load values, and may be set to the same value.

Although the invention has been described with reference to the embodiment, the invention is not limited to the configuration described in the embodiment, and various modes may be taken within a range described in the claims may be employed.

The invention claimed is:

1. A seatbelt warning apparatus comprising:
   a seatbelt configured to constrain a passenger seated on a vehicle seat when fastened and release the passenger when not fastened;
   a load detection unit configured to detect a load acting on a seat surface of the vehicle seat;
   a warning member configured to encourage fastening of the seatbelt according to the load detected by the load detection unit; and
   a control unit configured to bring a mode to one of a not-seated recognition mode which corresponds to a not-seated state, a passenger-seated recognition mode in which it is determined that the passenger is seated and the warning member is brought into an operation-permitted state, and a baggage recognition mode in which it is determined that a baggage is placed and the warning member is brought into an operation-not-permitted state, wherein
   the control unit performs a first transition process configured to transfer the mode to the baggage recognition mode on the condition that the load detected by the load detection unit is larger than a first load and smaller than a second load continuously for a first preset time in the not-seated recognition mode,
   the control unit performs a second transition process configured to transfer the mode to the passenger-seated recognition mode on the condition that the load detected by the load detection unit is larger than the second load continuously for a second preset time in the not-seated recognition mode,
   the control unit is configured to transfer the mode to the not-seated recognition mode on the condition that the load detected by the load detection unit is smaller than a third load continuously for a third preset time in either the baggage recognition mode or the passenger-seated recognition mode, and
   the first preset time is set to be shorter than a time T, wherein the time T is a time obtained from a plurality of load versus time profiles in which the load increases from the first load to the second load based on a magnitude of vehicle acceleration.

2. The seatbelt warning apparatus according to claim 1, wherein the load detection unit includes two load sensors arranged on a left and a right side of a rear portion of the vehicle seat on a lower side thereof, and the time T corresponds to time required for the load detected by the load detection unit by a fore-and-aft acceleration caused by the acceleration of the vehicle to increase from the first load to the second load.

3. The seatbelt warning apparatus according to claim 1, wherein the load detection unit includes two load sensors arranged on a front and a rear on one of a left and a right of a lower side of the vehicle seat, and the time T corresponds to time required for the load detected by the load detection unit by a lateral acceleration caused by turning the vehicle to increase from the first load to the second load.

4. The seatbelt warning apparatus according to claim 1, wherein the first preset time is half the time T.

5. The seatbelt warning apparatus according to claim 1, wherein the third preset time in the baggage recognition mode is equal to the third preset time in the passenger-seated recognition mode.

6. A seatbelt warning apparatus of a vehicle seat, the vehicle seat including a seatbelt configured to constrain a passenger seated on the vehicle seat when fastened and release the passenger when not fastened and a load detection unit configured to detect a load acting on a seat surface of the vehicle seat, the seatbelt warning apparatus comprising:
 a control unit configured to bring a mode to one of a not-seated recognition mode which corresponds to a not-seated state, a passenger-seated recognition mode in which it is determined that the passenger is seated and a warning member is brought into an operation-permitted state, and a baggage recognition mode in which it is determined that a baggage is placed and the warning member is brought into an operation-not-permitted state, wherein the control unit performs a first transition process configured to transfer the mode to the baggage recognition mode on the condition that the load detected by the load detection unit is larger than a first load and smaller than a second load continuously for a first preset time in the not-seated recognition mode, the control unit performs a second transition process configured to transfer the mode to the passenger-seated recognition mode on the condition that the load detected by the load detection unit is larger than the second load continuously for a second preset time in the not-seated recognition mode, the control unit is configured to transfer the mode to the not-seated recognition mode on the condition that the load detected by the load detection unit is smaller than a third load continuously for a third preset time in either the baggage recognition mode or the passenger-seated recognition mode, and the first preset time is set to be shorter than a time T, wherein the time T is a time obtained from a plurality of load versus time profiles in which the load increases from the first load to the second load based on a magnitude of vehicle acceleration.

* * * * *